United States Patent [19]

Weman

[11] Patent Number: 4,473,242
[45] Date of Patent: Sep. 25, 1984

[54] SAFETY BELT SYSTEM

[75] Inventor: Per O. Weman, Heverlee, Belgium

[73] Assignee: N. V. Klippan S.A., Heverlee-Leuven, Belgium

[21] Appl. No.: 386,163

[22] Filed: Jun. 7, 1982

[30] Foreign Application Priority Data

Jun. 11, 1981 [FR] France .................. 81 11541

[51] Int. Cl.³ .................................. A62B 35/00
[52] U.S. Cl. .................................. 280/801; 280/806
[58] Field of Search ............ 280/801, 806, 802, 807; 297/468, 473, 482

[56] References Cited

U.S. PATENT DOCUMENTS

| 3,337,237 | 8/1967 | Weiss | 297/468 |
| 4,239,260 | 12/1980 | Hollowell | 280/806 |
| 4,273,210 | 6/1981 | Nitzbon | 280/806 |

FOREIGN PATENT DOCUMENTS

| 850493 | 9/1970 | Canada | 280/806 |
| 2039103 | 2/1972 | Fed. Rep. of Germany | 280/801 |
| 2919979 | 11/1980 | Fed. Rep. of Germany | 280/801 |

Primary Examiner—Joseph F. Peters, Jr.
Assistant Examiner—Kenneth R. Rice
Attorney, Agent, or Firm—Roger H. Criss; Roy H. Massengill

[57] ABSTRACT

The belt system, advantageously including a retractor (13) mounted on the seat (1) and directly involving the lap belt section (8), comprises an attachment buckle (7) connected to its anchor point (10) by an expandable link device (11), which normally permits a range of movement of buckle (7) away from anchor point (10) or toward the latter (for example by means of a return spring), but provided with means to oppose the extraction of the buckle (7) under predetermined conditions of acceleration of the vehicle and/or of the belt.

8 Claims, 6 Drawing Figures

SAFETY BELT SYSTEM

DESCRIPTION

Background of the Invention

The present invention relates to a safety belt system designed to hold an occupant on a seat, more particularly in an automobile vehicle, comprising a length of belting, a belt winder connected to one end of the belt, and an attachment buckle connected to an anchor point and designed to cooperate selectively with an attaching latch fitting mounted on the belt and defining, normally for the latter, a lap belt section and a shoulder belt section.

The so-called "wind-up" safety-belt systems which are very widely used today, suffer from two types of drawbacks in use, that are due primarily to the principle of the winder itself, and relating to the tension exerted on the belt system, and on the effect of slip of the turns of the belt wound on the winder shaft, in the event of a heavy load applied to the belt. As a matter of fact, the belt, after it is attached, assumes its position of equilibrium, tightly against the user, under the influence exclusively of the return spring of the winder, which must be generously proportioned to permit a complete retraction into the configuration of non-use of the entire length of the belt, whatever the type of safety-belt system involved. Through the set of belt connections (in particular, the upper connection at the level of the vehicle post, in a so-called "three-point" system, and a connection at the level of the attachment latch fitting), the relating strong tension of the winder spring is exerted in a differential fashion on the two working sections of the belt, and these therefore have displacement characteristics which are also different. Thus, in a classic "three-point" system, the winder exerts a continuous and substantial tension, which is sometimes uncomfortable, on the chest of the user, while the lap section, which is urged less directly, very reluctantly allows relative, horizontal movements of the pelvis of the occupant, whether in order to find a different and more comfortable position on the seat cushion, or, in particular, when the seat is to be advanced, for example, to make room in the rear for a tall occupant.

It would be desirable to provide a safety belt system that permits the elimination of these drawbacks by allowing horizontal displacement of the occupant, and providing much greater comfort in the wearing of the safety belt, and making it possible to reduce the return force of the winder spring by reducing the total length of the belt to be retracted into the normal configuration at rest.

SUMMARY OF THE INVENTION

In accordance with this invention, there is provided a vehicle seat belt system designed to retain an occupant on a seat, comprising a length of seat belt, a retractor connected to one end of the belt, and an attachment buckle linked to an anchor point and adapted to cooperate with an attachment latch fitting mounted on the belt and normally defining for the belt a lap belt section and a shoulder belt section, characterized in that the attachment buckle is connected to the anchor point by an expandable link device.

In the description which follows, and in the claims, the expression "expandable link device" refers to a return linkage that permits a controlled range of movement, that can be locked under certain conditions relative to the anchor point, alternately away from, or toward this anchor point.

It will be understood that this "floating" arrangement, while observing the required conditions of safety and mechanical dependability, will permit on the one hand, reducing the working length of the belt pulled out to make the attachment, and yet, reducing the strength of the winder return spring, and on the other hand, will permit, essentially with respect to the lap belt section, greater and particularly welcome freedom of movement of the user's pelvis.

The winder is preferably connected to the end of the lap belt section opposite the attachment latch fitting, and is preferably mounted on a low-lying structural part integral with the chassis of the vehicle.

With this arrangement, allowed by the expandable link combined with the attachment buckle, and permitting a more marked and simpler range of movement of the lap belt section, the winder directly involves the lap belt section, permitting a considerable reduction in the necessary length of belt, and hence reducing the return force of winder spring, which therefore exerts a less pronounced pressure of the shoulder belt section on the chest of the occupant. This arrangement also eliminates the uncomfortable gymnastics, particularly on the part of old persons, in the search for the latch fitting behind the shoulder in order to bring it level with the opposite thigh.

DESCRIPTION OF THE PREFERRED EMBODIMENTS

Figure 1:
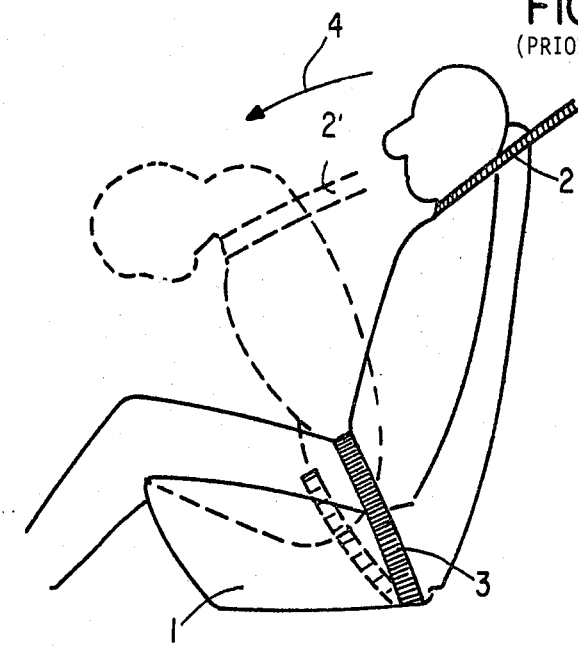
FIGS. 1 and 2 represent sketches illustrating the various displacements of the parts of the body of a user with a classic safety-belt system and the system according to the invention.
Figure 2:
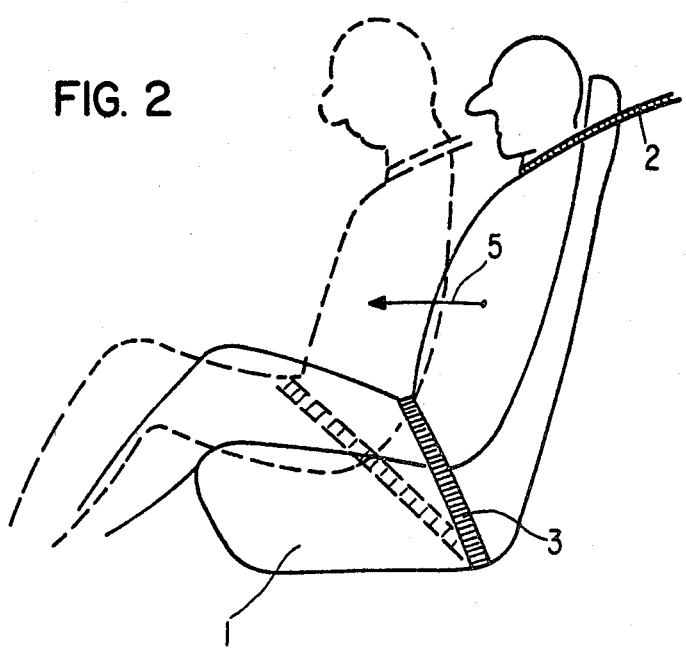

Returning to the drawback mentioned above, of the effect of slip of the turns wound on the shaft of the winder, it is noted, as a matter of fact, and suprisingly, that the transfer of the "slack" of the belt resulting from this slip, from the turns of the shoulder belt section (as is generally the case today) to the lap belt section, made for greater safety for the belted passanger. As a matter of fact, in a classic safety belt system of the "three-point" type, represented in FIG. 1, the slack, or the loose stretch in question (which can be as much as 100 mm) appears mostly, for the reasons given above, on the shoulder belt section, while for the same reasons, the lap belt section 3 is substantially unaffected thereby, which, in case of accident, particularly a frontal impact, results in a pronounced swing, shown by arrow 4, of the upper part of the occupant's body, with accentuated forces at the level of the neck, generally termed "hyperflection." With the system according to the invention, having the lap belt section 3 urged directly by the winder, in case of an accident, as represented in FIG. 2, the slack in question, this time involving the lap belt section, and to a much lesser degree the shoulder belt section, allows a substantially horizontal displacement of the entire body, as shown by arrow 5, distributing in a much better balanced and more judicious way, the take-up of the stress forces by the two sections of the belt, without causing any pronounced sinking of the user's buttocks into the seat cushion, thereby limiting the "submarine" effect, and considerably diminishing the deceleration at the level of the neck of the user.

Figure 3:
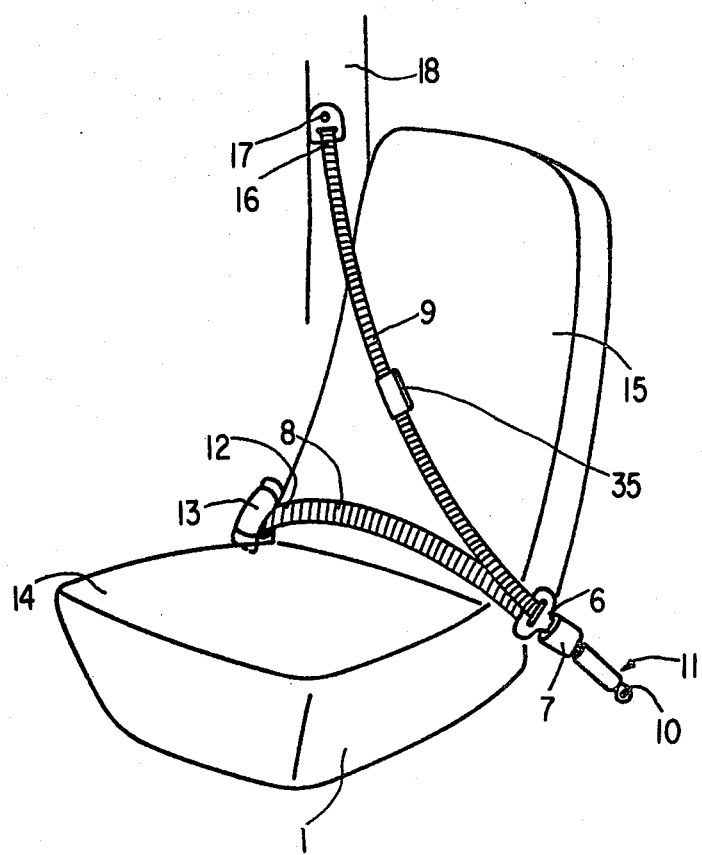
FIG. 3 represents a means of installation of a safety-belt system according to the invention.

As represented in FIG. 3, the safety belt system according to the invention, designed to belt and hold a passenger on a seat 1, typically of an automobile vehicle, comprises a length of belt equipped with an attachment latch fitting 6 designed to cooperate with an attachment buckle 7, for example of classic construction, and thereby defining, in buckled configuration, longitudinally to the belt, a lap belt section 8 and a shoulder belt section 9. According to the invention, instead of being connected by a link member that is normally undeformable at its bottom anchor point 10, the attachment buckle 7 is linked to this anchor point 10 by an expandable device with return mechanism 11. According to a more particular aspect of the invention, the end 12 of the lap belt section 8 opposite the latch fitting 6, is connected directly to a retractor 13 mounted, in the present case, directly on the side of the seat, at the level of the zone of connection between the seat cushion part 14 of the seat, and its back 15. The upper end 16 of the shoulder belt section 9 is fixed directly to an anchor fitting 17 mounted at the top of post 18 of the chassis of the automobile. As can be seen, this arrangement makes it possible to reduce the length of the belt necessary for the buckled belting of the seat occupant to the absolute minimum, and hence to reduce to a considerable extent the force of the return spring of retractor 13. As a variation, of course, without departing from the scope of the invention, retractor 13 can be mounted at the level of the base of post 18, or too, according to the needs of the interior fittings of the cab of the vehicle, at a raised point on the chassis, with the lower connection of the belt at the level of the bottom rear part of cushion 14 of the seat 1.

In the description which follows, of various means of embodiment of the expandable link device 11, identical or similar elements bear the same reference numbers. As a general rule, the link device 11 comprises a hollow shell 19, rigid in shape, made, for example, of molded metal or from a metal disk, having, at one end, a recess or hole 20 for the passage of an anchor bolt to the chassis of the vehicle, or to a structural element integral with the latter. In shell 19 there is mounted and guided a rigid rod portion 21, made of steel, for example, whereof the outer end is fixed to the attachment buckle 7.

Figure 4:
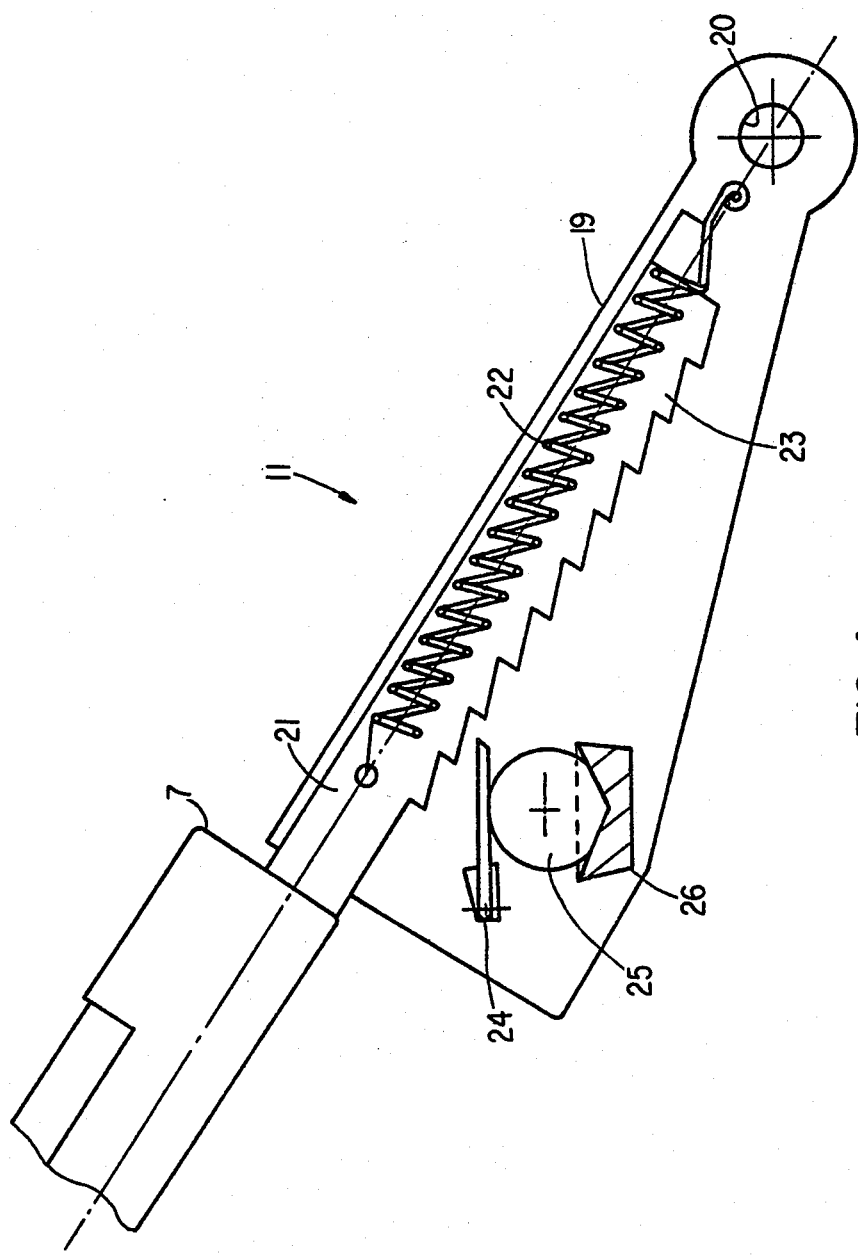
FIG. 4 represents a first means of embodiment of the expandable link device for the attachment buckle according to the invention.

In the embodiment of FIG. 4, rod 21 is normally urged toward anchor hole 20 by a return spring 22, and one face of the rod exhibits a longitudinal series of profiled teeth 23 which are to cooperate with a pawl element 24 selectively actuatable to prevent an extraction of rod 21 from shell 19 under certain critical conditions. In the embodiment represented, pawl element 24 bears on the top of an inertial ball mass 25, normally centered and pressing on a cup 26 integral with shell 19, using a technique commonly applied for locking safety belt retractors, and it will merely be stated that in case of sudden acceleration or deceleration of the vehicle, inertial ball 25 is induced to leave its position of rest on cup 26 and raise pawl 24, bringing it into locking engagement with an adjacent tooth in the series of teeth 23 on rod 21, and thus, during the entire time of the critical condition, a rigid link between buckle 7 and its anchor point 10 is restored in the manner of traditional systems.

Figure 5:
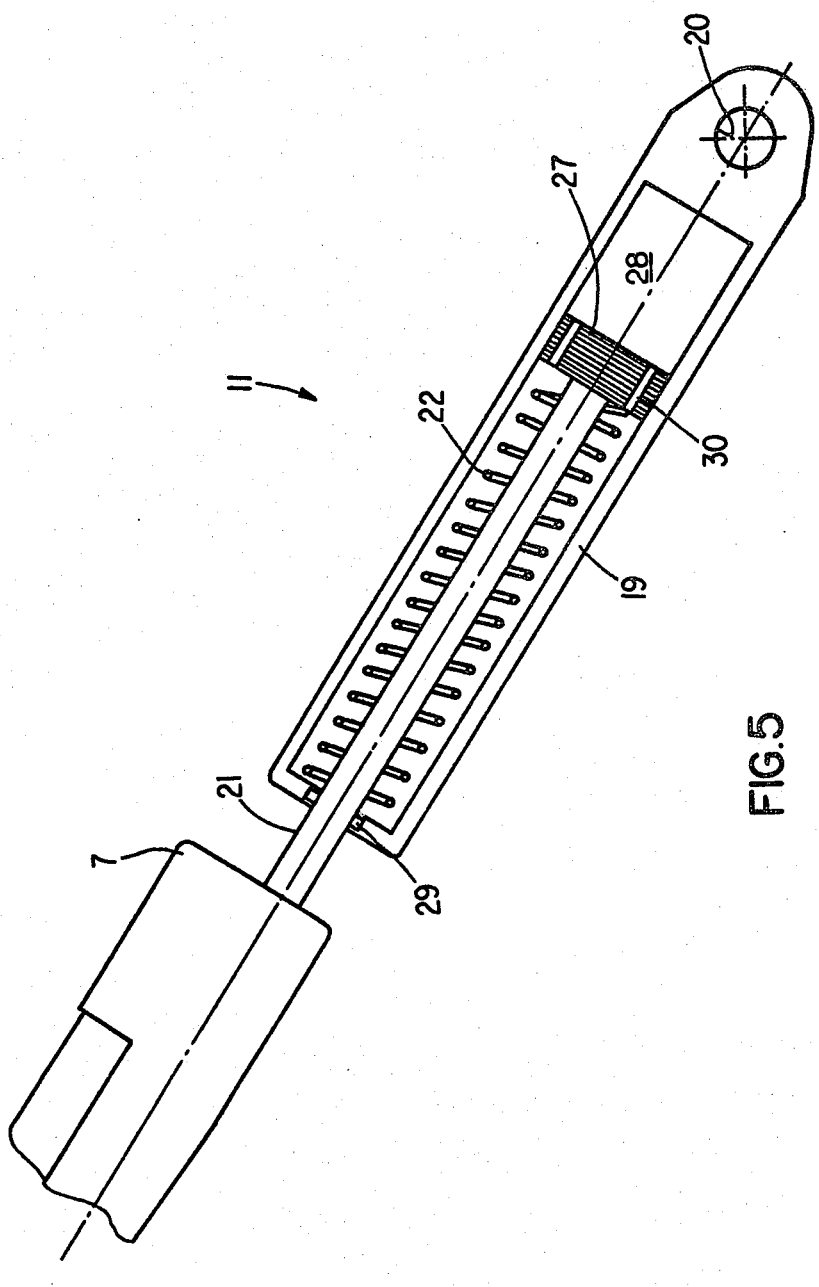
FIG. 5 represents a second means of embodiment of this expandable link device.

In the embodiment of FIG. 5, at the inner end of rod 21 there is fixed a piston element 27, moving in a tight cylindrical bore 28 in shell 19, which thus forms a cylinder for piston 27, whose inner chamber is sealed at the level of the passage of rod 21 by a gasket 29. Return spring 22 is here disposed between piston element 27 and the opposite face of chamber 28, which is filled with a fluid, preferably incompressible and viscous, for example oil or glycerin. In the piston element 27, through passages 30 are formed, which permit intercommunication, with throttling of the fluid between the two cylinder chamber parts on either side of the piston 27, which then acts as a damper or shock absorber. That is to say, it permits a flexible range of movement in both directions, without noticeable opposition, of piston element 27, for slow rates of displacement of the latter, but embodying in practice an immediate blocking of the displacement of piston 27 in the event of a sudden force of extraction exerted on rod 21, thus restoring, momentarily, the characteristic of a rigid link between buckle 7 and its anchor point 10.

Figure 6:
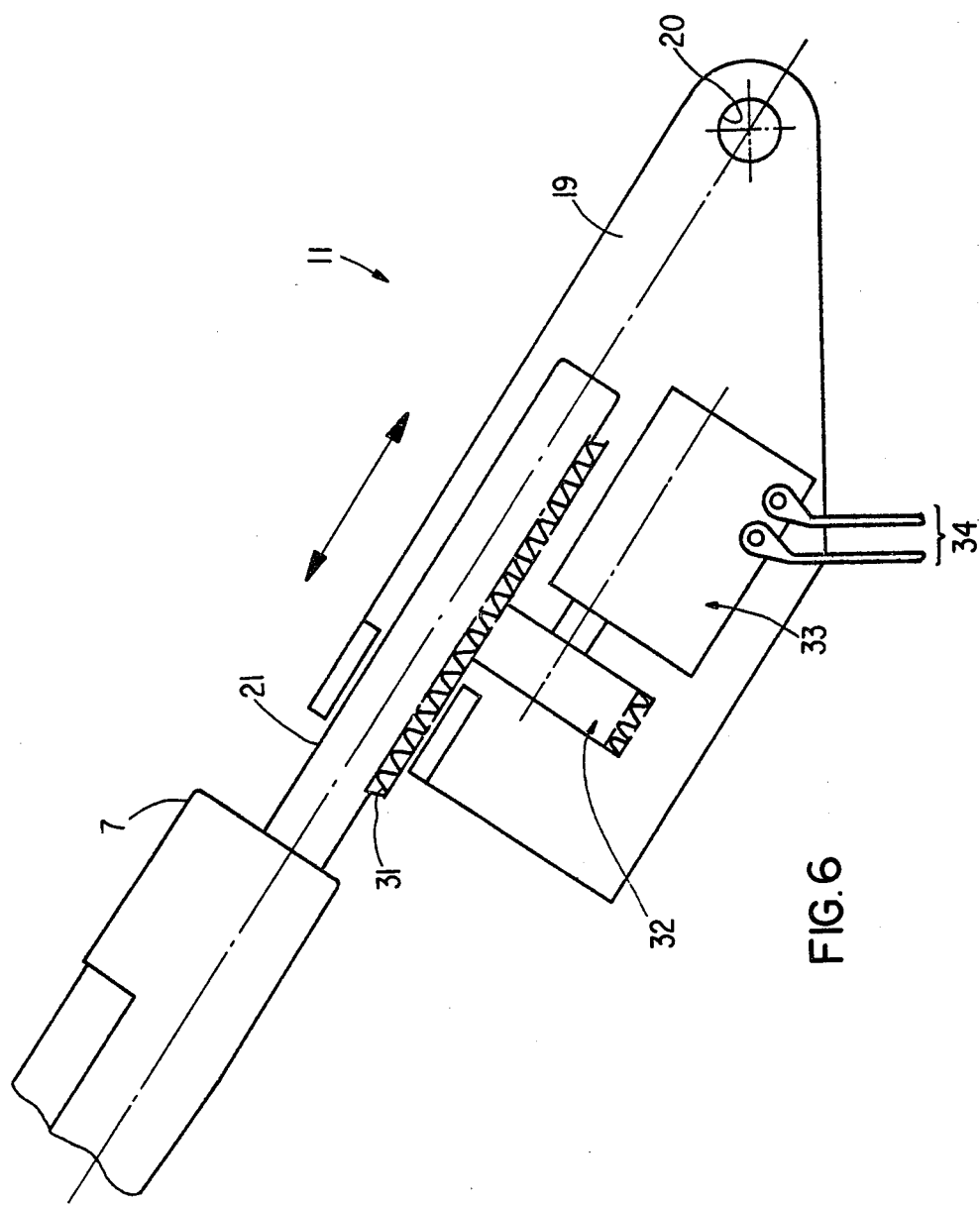
FIG. 6 represents a third means of embodiment of this expandable link device for the attachment buckle.

In the embodiment of FIG. 6, rod 21 comprises, along one of its surfaces, a longitudinal rack 31, engaged with a worm gear 32 mounted on the shaft of a reversible electric motor 33 linked by leads 34 to a control device (not shown) actuating the motor in response to a signal furnished by a tension detector 35 (FIG. 3) arranged on shoulder belt section 9 and calibrated to detect a predetermined threshold of tension in the belt, for example on the order of 2.5 Newton. In this way, for a normal belt tension of 2.5 N, motor 33 is not normally actuated. When the belt tension becomes higher than 2.5 N, the motor is started in one direction to displace rod 21 toward the outside until the shoulder belt tension returns to the nominal value, while, when the belt tension is lower than 2.5 N, motor 33 is started in the other direction to retract rod 21, and thereby place the belt under tension until the tension of the latter returns to the nominal value. The tension detector 35 can, in this case, also serve to pilot an electric motor-driven retractor, as is likewise known in the art. This arrangement, therefore, is very particularly suitable for so-called "passive" safety-belt systems.

Anchor point 10 of extendable link device 11 can be provided on the floor of the vehicle, or, likewise, advantageously, directly on the seat 1. The anchor point of the upper end 16 of the shoulder belt section 9 may alternatively be provided on the back of the seat itself.

I claim:

1. A safety belt system, designed to retain an occupant on a vehicle seat, comprising a length of seat belt; a retractor connected to one end of the belt; and an attachment buckle linked to an anchor point and designed to cooperate with an attachment latch fitting mounted on the belt and normally defining for the belt a lap belt section and a shoulder belt section, characterized in that the attachment buckle is connected to said anchor point by an expandable link device, said expandable link device having return means for maintaining a tension on the seat belt and means for opposing the separation of the buckle relative to the anchor point under predetermined conditions of acceleration or deceleration of the vehicle and/or of the belt.

2. Safety belt system according to claim 1, characterized in that the retractor is connected to the end of the lap belt section opposite the latch fitting.

3. Safety belt system according to claim 2, characterized in that the retractor is mounted on a structure integral with the chassis of the vehicle at a level no higher than the seat cushion surface of the seat.

4. Safety belt system according to claim 1, characterized in that said means for opposing comprises a rod integral with a piston sliding in a cavity in a shell forming a cylinder and filled with a fluid, said piston having at least one through opening to throttle the fluid flow therethrough with the movement of said piston.

5. Safety belt system according to claim 1 characterized in that said expandable link device comprises a rod having one end connected to said attachment buckle and the other end slidably received in one end of a fixed shell, the other end of said fixed shell connected to said anchor point.

6. Safety belt system according to claim 5, characterized in that said return means comprises a longitudinal rack attached to said rod engaging with a worm gear entrained by a reversible electric motor controlled by a tension detector on one section of said seat belt, said reversible motor and worm gear displacing said longitudinal rack in a direction to achieve a predetermined tension on said seat belt.

7. Safety belt system according to claim 5, characterized in that said return means elastically urges said rod toward the anchor point.

8. Safety belt system according to claim 7, characterized in that said means for opposing comprises an inertial member actuating a locking pawl into engagement with locking teeth provided on said rod to oppose a displacement of said rod away from the anchor point.

* * * * *